United States Patent
van der Lely

[11] 3,983,943
[45] Oct. 5, 1976

[54] SOIL CULTIVATING IMPLEMENT COMBINATIONS

[76] Inventor: Cornelis van der Lely, 7, Bruschenrain, Zug, Switzerland

[22] Filed: Oct. 29, 1974

[21] Appl. No.: 518,742

[30] Foreign Application Priority Data
Oct. 26, 1973 Netherlands .................... 7314805

[52] U.S. Cl. .................................. 172/70; 172/71; 172/78; 172/59; 172/169; 172/421; 172/532; 172/599; 172/552
[51] Int. Cl.² ................... A01B 49/02; A01B 7/00
[58] Field of Search ............... 172/59, 63, 71, 169, 172/70, 78

[56] References Cited
UNITED STATES PATENTS

| | | | |
|---|---|---|---|
| 46,025 | 1/1865 | Reynolds et al. ...................... | 172/63 |
| 3,616,862 | 11/1971 | van der Lely .......................... | 172/59 |
| 3,821,989 | 7/1974 | van der Lely et al ................ | 172/59 |

*Primary Examiner*—George J. Marlo
*Attorney, Agent, or Firm*—Mason, Mason & Albright

[57] ABSTRACT

A combination implement has a leading cultivator with fixed tines and a rear rotary harrow with driven soil working tined members. The cultivator has side ground wheels with vertical adjusting means that controls the working depths of the fixed tines. The harrow has a trailing roller that is interconnected to the harrow frame with arms that also have an adjustment feature so that the working depths of the harrow's tined members can be regulated. The cultivator and harrow are linked to one another by a parallelogram linkage so that they can be disconnected from one another and individually connected to the three point lift of a prime mover. When the combination is assembled, a suspended drive shaft of the harrow's driving system is passed through the cultivator and connected to the p.t.o. of the prime mover.

15 Claims, 2 Drawing Figures

SOIL CULTIVATING IMPLEMENT COMBINATIONS

Figure 1:
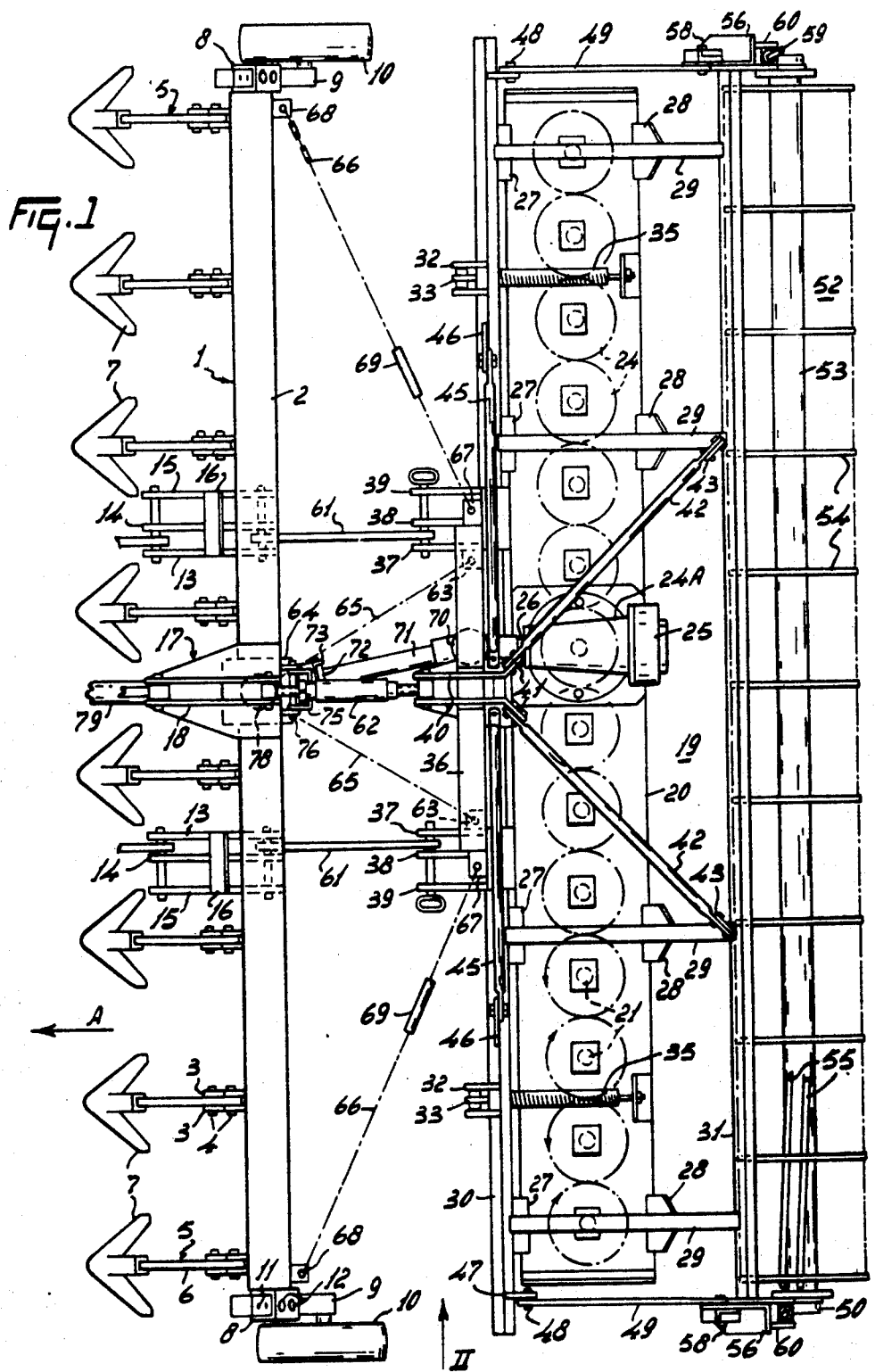
Figure 2:
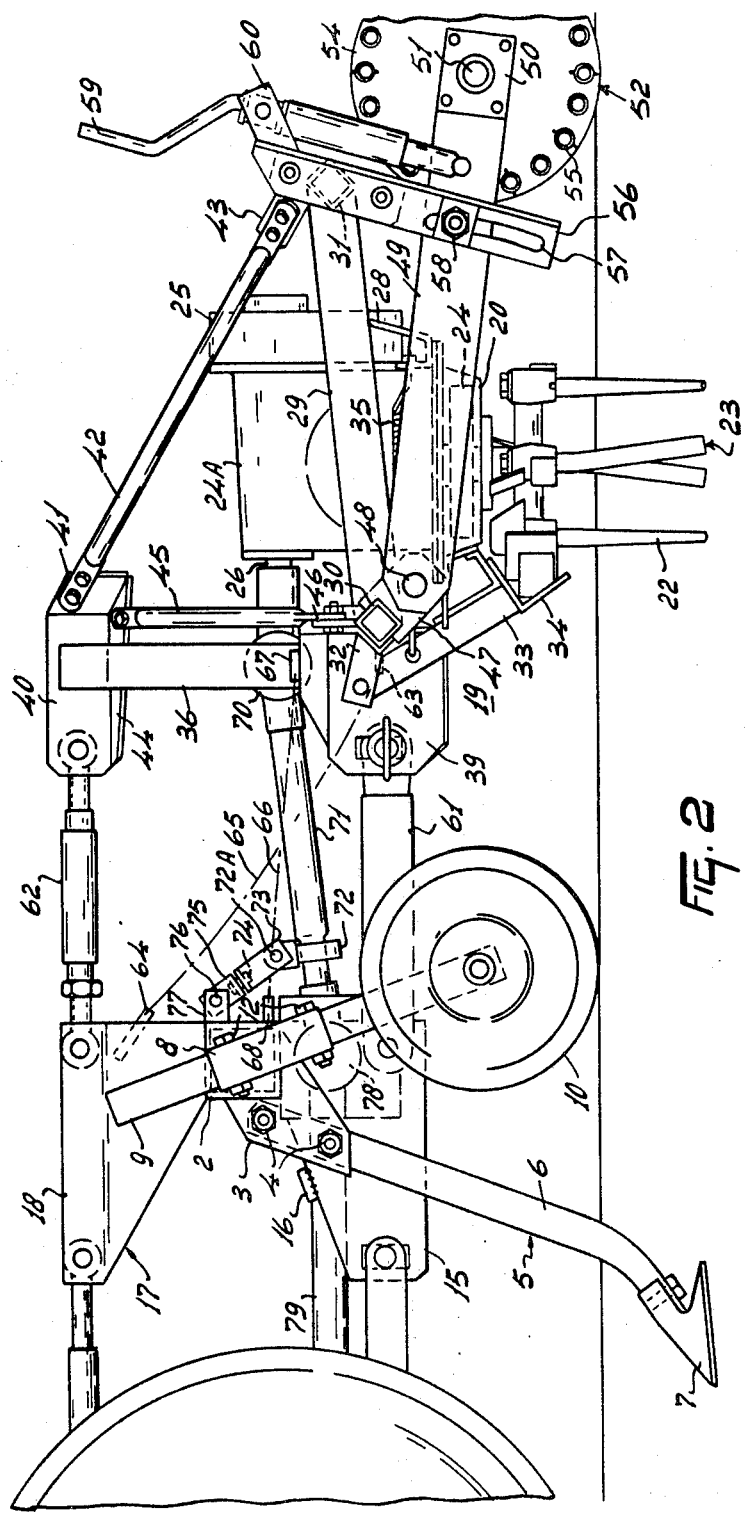

For a better understanding of the invention, and to show how the same may be carried into effect, reference will now be made, by way of example, to the accompanying drawings, in which:

FIG. 1 is a plan view of a combination in accordance with the invention connected to the rear of an agricultural tractor, and FIG. 2 is a side elevation as seen in the direction indicated by an arrow II in FIG. 1.

Referring to the drawings, the combination which is illustrated comprises a cultivator 1 which is disposed foremost with respect to the intended direction of operative travel of the combination that is indicated by an arrow A in FIG. 1 and a rotary harrow 19 that is disposed behind the cultivator 1 with respect to said direction. The leading soil cultivating implement in the form of the cultivator 1 has a main frame beam 2 that extends substantially horizontally perpendicular to the direction A, the beam 2 being of hollow formation with a polygonal cross-section which is preferably, as illustrated, square. Pairs of lugs 3 are secured to the front of the beam 2 with respect to the direction A in regularly spaced apart relationship along the length of that beam and each pair of lugs 3 has the upper end of a corresponding downwardly and forwardly inclined tine 5 rigidly secured to them by a pair of transverse bolts 4. Each tine 5 comprises a support 6 that is of oblong cross-section and that is arranged in such a way that the two broader sides of that cross-section extend substantially parallel to the direction A. The lowermost end of each support 6 is bent over forwardly to some extent with respect to the direction A to form a portion that is less steeply inclined to the horizontal than is the remainder of the support, said portion being provided with a goosefoot hoeing member 7 which is rigidly but releasably secured to the support concerned by a bolt. The two opposite ends of the main frame beam 2 have sleeves 8 of substantially square cross-section rigidly secured to them in such a way that the longitudinal axes thereof are contained in planes that are substantially parallel to the direction A, said axes being inclined to the vertical by a few degrees in such a way that the upper end of each sleeve 8 is further advanced with respect to the direction A than is the lower end thereof. A ground wheel mounting 9 of square cross-section is slidable upwardly and downwardly in each sleeve 8, the mountings 9 being formed with transverse holes 11 and the walls of the sleeves 8 being formed with holes that are capable of registering therewith so that upper and lower bolts 12 can be entered through the walls of the sleeves 8 and chosen holes 11 to maintain the wheel mountings 9 in corresponding height settings relative to the beam 2. The lowermost ends of the mountings 9 carry axle shafts upon which ground wheels 10 are rotatably disposed so as to lie laterally just beyond the opposite ends of the beam 2.

The front of the beam 2 with respect to the direction A is provided, at two locations that are spaced apart from one another by equal distances from the middle of the transverse length of the beam 2, with substantially symmetrically identical assemblies of coupling plates 13, 14 and 15. The plates 13, 14 and 15 project with respect to the direction A from the beam 2 and each of them is contained in a plane that is substantially parallel to the direction which has just been mentioned. The upper edges of the three plates 13, 14 and 15 of each assembly are interconnected by a corresponding strip 16. A central region of the beam 2 that lies midway between the two coupling plate assemblies that have just been described carries two upwardly directed and generally triangular coupling plates 17 whose uppermost edges are substantially horizontally disposed. The two plates 17 have lower portions which are in upwardly convergent relationship and upper portions 18 that are substantially vertically disposed in parallel, but spaced apart, relationship with one another. Substantially horizontally aligned holes are formed in the two upper plate portions 18 close to the front, and to the rear, of those portions with respect to the direction A.

The second soil cultivating implement of the combination in the form of the rotary harrow 19 has a hollow frame portion 20 that extends substantially horizontally perpendicular to the direction A. The frame portion 20 rotatably supports a plurality, such as fourteen, of rotary soil working members or rotors 23 each of which is arranged to revolve around the axis of a corresponding substantially vertical, or at least non-horizontal shaft 21 and each of which is provided with a corresponding pair of soil working tines 22. The shafts 21 are arranged in a single row and are spaced apart from one another by distances of not less than substantially 25 centimeters, each soil working member or rotor 23 being dimensioned so that its tines 22 work a strip of soil whose width is a little greater than the distances between the shafts 21 so that the strips of soil worked by the individual members or rotors 23 overlap one another to produce, in effect, a single broad strip of worked soil. Each shaft 21 is provided, inside the hollow frame portion 20, with a corresponding straight- or spur-toothed pinion 24 and it will be evident from FIG. 1 of the drawings that the teeth of each pinion 24 are in mesh with those of its neighbour, or both of its neighbours, in the single row thereof that is contained inside the hollow frame portion 20. One of the central pair of shafts 21 of the row thereof has an upward extension through the top of the frame portion 20 into a gear box 24A and that extension is in driven connection with a substantially horizontal shaft (not visible in the drawings) that is contained within the gear box 24A so as to extend substantially parallel to the direction A, the connection between said shaft and said extension being established by bevel pinions. The rear-most end of the substantially horizontal shaft which has just been mentioned projects into a change-speed gear 25 mounted at the back of the gear box 24A as also does the rearmost end of an overlying substantially horizontally parallel shaft 26 whose leading splined or otherwise keyed end projects forwardly from the front of the gear box 24A to serve as a rotary input shaft of the gear box. It is not necessary to describe the construction of the change-speed gear 25 in detail, but, briefly, it comprises exchangeable and/or interchangeable pairs of co-operating toothed pinions that can be mounted on the rear ends of the shaft 26 and the underlying parallel shaft that is not visible in the drawings to produce a transmission ratio between those two shafts which is dependent upon the particular pinions, or arrangement thereof, that is employed. The soil working members or rotors 23 can thus be rotated at any chosen one of a number of different speeds in response to an unchanged speed of rotation applied to the leading end of the shaft 26.

The top and front of the frame portion 20 with respect to the direction A is provided with four brackets 27 that are located in spaced apart relationship symmetrically at opposite sides of the center of said frame portion. Four further brackets 28 are carried at the top and rear of the frame portion 20 with respect to the direction A in alignment with corresponding brackets 27 considered in directions parallel to the direction A. The brackets 27 and 28 are interconnected by four supporting members 29 that all extend parallel to the direction A when the combination is viewed in plan (FIG. 1). The front brackets 27 are of slightly less height than the rear brackets 28 with the result that, as can be seen in FIG. 2 of the drawings, the supporting members 29 are inclined to the horizontal by a few degrees with their leading ends at a lower horizontal level than their rearmost ends. The leading ends of the supporting members 29 are secured to a frame beam 30, as well as to the brackets 27, while the rearmost ends thereof, that project rearwardly beyond the brackets 28, are rigidly secured to a frame beam 31. The two frame beams 30 and 31 both extend substantially horizontally perpendicular to the direction A and both of them preferably, as illustrated, have a hollow tubular formation and a substantially square cross-section. The longitudinal axes of the two beams 30 and 31 are parallel to one another and to a horizontal line interconnecting the axes of rotation of the soil working members or rotors 23 that are afforded by the corresponding shafts 21. It will be evident from the drawings that the rear frame beam 31 is located at a greater distance from the frame portion 20 than is the front frame beam 30.

The leading frame beam 30 is provided at some distance from both its opposite ends with pairs of forwardly projecting upwardly inclined lugs 32 between the foremost free ends of which corresponding arms 33 are turnably mounted by horizontal pivots. The arms 33 extend downwardly and rearwardly from their pivots with respect to the direction A and their lowermost ends carry a shield 34 of substantially L-shaped cross-section, said shield 34 serving to protect the regions in which the tines 22 are fastened to supports of the members or rotors 23 from being struck by stones and other potentially damaging articles that may be met with. Helical tension springs 35 that extend substantially horizontally parallel to the direction A interconnect the arms 33 and anchorages at the rear of the frame portion 20, said springs 35 tending to retain the arms 33 and the shield 34 in the position illustrated in the drawings but being capable of being stretched temporarily to allow the shield 34 to turn downwardly and forwardly to some extent about the pivotal connections of the arms 33 to the lugs 32 so that a stone or the like trapped between one of the soil working members or rotors 23 and the rear side of the shield 34 can be automatically discharged from its trapped position. The springs 35 extend immediately above the upper surface of the frame portion 20. A generally triangular coupling member or trestle 36 is provided in a central region of the leading frame beam 30 and the opposite ends of the base of said coupling member or trestle 36 are provided with two symmetrical assemblies of coupling plates 37, 38 and 39. Each of the six coupling plates 37, 38 and 39 is contained in a corresponding substantially vertical plane that is substantially parallel to the direction A and it will be noted from FIG. 1 of the drawings that, in each assembly, the middle plate 38 is closer to the corresponding plate 37 than it is to the corresponding plate 39. Similarly, the middle plates 14 of the coupling plate assemblies carried by the frame beam 2 of the cultivator 1 are closer to the corresponding plates 13 than they are to the corresponding plates 15. In each case, the plates 13 and 37 are those which are closest to the midpoints of the frame beams 2 and 30 respectively. The apex of the coupling member or trestle 36 is provided with two substantially vertical plates 40 that both extend substantially parallel to the direction A in relatively spaced apart relationship, rearmost ends of those plates 40 with respect to said direction A being bent over in opposite directions to form rearwardly divergent portions 41. Tie rods 42 diverge downwardly and rearwardly away from the plate portions 41 and have their rearmost and lowermost ends rigidly secured to anchorages 43 that are secured to the rear frame beam 31. Lower edge regions of the two plates 40 are bent over in opposite directions to form inclined portions 44 and these portions 44 are rigidly connected to lugs 46 on the leading frame beam 30 by downwardly and outwardly convergent tie rods 45.

The leading frame beam 30 of the rotary harrow 19 is provided, close to its opposite ends, with downwardly and rearwardly inclined lugs 47 that lie just beyond the opposite ends of the frame portion 20. The leading ends of arms 49 are turnably connected to the lugs 47 by substantially horizontally aligned pivots 48 and the opposite rearmost ends of said arms 49 carry horizontal bearings 50 which rotatably support stub shafts 51 at the opposite ends of a rotary supporting member in the form of a ground roller 52. The ground roller 52 extends throughout substantially the whole of the working width of the harrow 19 and comprises a central tubular support 53, located between the stub shafts 51, a plurality (such as eleven) of vertically disposed substantially circular plates 54 that are arranged in regularly spaced apart relationship along the length of the support 53 and a plurality, such as twenty, of elongated tubular members 55 that extend through openings in the peripheries of the plates 54 in helically wound relationship with the central support 53. The elongated members 55 are spaced apart from one another at regular angular intervals around the longitudinal axis of the central support 53 and are movably mounted in the holes in the plates 54 by which they are carried.

The opposite ends of the rear frame beam 31 of the harrow 19 are provided with corresponding bars 56 of substantially L-shaped cross-section which bars 56 are disposed in generally upright positions but are actually inclined to the vertical to some extent in such a way that their lowermost ends are further advanced with respect to the direction A than are their uppermost ends. Lower end regions of limbs of the two bars 56 that extend substantially parallel to the direction A are formed with arcuate slots 57 whose center of curvature are coincident with the axis defined by the pivots 48. Clamping bolts 58 that are carried by the arms 49 have their shanks entered through the slots 57 for co-operation with nuts which can be tightened to secure the arms 49 firmly to the bars 56. An adjusting member in the form of a telescopic spindle assembly 59 which it is not necessary to describe in detail is provided immediately behind each bar 56 with respect to the direction A, lowermost ends of the assemblies 59 being pivotally connected to the arms 49 and upper regions thereof being pivotally connected to lugs 60 that project rearwardly and upwardly from the upper ends of the bars 56. The arrangement is such that, when the nuts associated with the clamping bolts 58 are loosened, cranked handles at the uppermost ends of the assemblies 59 can be rotated in appropriate directions to turn the arms 49 and the roller 52 which they carry either upwardly or downwardly about the pivots 48 relative to the remainder of the harrow 19. Once an appropriate height setting has been attained, the nuts on the clamping bolts 58 are retightened to maintain that height setting in a positive manner.

The rotary harrow 19 is connected to the cultivator 1 by lower strip-shaped arms 61 that extend generally parallel to the direction A and whose rearmost ends are pivotally mounted between the inner and middle coupling plates 37 and 38 of each coupling plate assembly by releasable pivots that define substantially horizontally aligned axes, it not being necessary to describe the construction and arrangement of the pivots in detail. The leading ends of the arms 61 are similarly mounted between the inner and middle coupling plates 13 and 14 of the two coupling plate assemblies of the cultivator 1 by further substantially horizontally aligned pivots. An arm 62 whose length is adjustable in a manner that is known per se has its leading end pivotally mounted between the two upper portions 18 of the coupling plates 17 by means of a horizontal pivot entered through the rear holes in those plate portions 18, the rearmost end of the arm 62 being pivotally mounted between the plates 40 in a similar manner by a substantially horizontal pivot entered through aligned holes in leading regions of those plates with respect to the direction A. In addition, two chains 65 extend forwardly from lugs 63 at the base of the coupling member or trestle 36 in convergent relationship (as seen in plan view — FIG. 1), their leading ends being fastened to a further large lug 64 that is mounted between rear regions of the two coupling plates 17. Two further chains 66 extend forwardly from lugs 67 that are located quite close to the lugs 63 in forwardly divergent relationship (as seen in plan view — FIG. 1), their leading ends being secured to lugs 68 carried by the rear of the cultivator frame beam 2 very close to the opposite ends of that beam. Each of the chains 66 incorporates in chain tensioner 69.

The forwardly projecting splined or otherwise keyed end of the shaft 26 of the gear box 24A is connected by a universal joint 70 to a rotary driving shaft 71 that is suspended in a bearing 72. A casing of the suspension bearing 72 is turnably connected by a substantially horizontal pivot pin 72A to the limbs of a forked bracket 73 at a location between those limbs. The base of the bracket 73 is, in turn, connected by a pivot bolt 74 to the base of a further forked bracket 75 whose limbs, in turn, are pivotally connected to a pair of lugs 77 at the top and rear of a central region of the frame beam 2 by a pivot pin 76. It will be noted that the suspension bearing 72 is turnable relative to the lugs 77 about three separate axes that are defined by the pins 72A and 76 and the intervening bolt 74. The axis defined by the bolt 74 is always perpendicular to the axes defined by the pins 72A and 76 whereas the axes defined by said pins 72A and 76 can extend parallel to one another although, as will be evident from FIG. 1 of the drawings, they do not usually do so. The leading end of the driving shaft 71 is connected by a universal joint 78 that is located just in front of the suspension bearing 72 to the rearmost end of a telescopic transmission shaft 79 that is of a construction which is known per se. The leading end of the transmission shaft 79 is connected, in the use of the combination, to the power take-off shaft of an operating agricultural tractor or other vehicle usually through the intermediary of a further universal joint which is not visible in the drawings.

The combination of two soil cultivating implements that has been described above is constructed and arranged in such a way that the combination can be disassembled and either of the two implements 1 and 19 be used individually without the other. The coupling members at the fronts of the two implements 1 and 19 with respect to the direction A are both capable of being connected to the three-point lifting device or hitch of an agricultural tractor or other operating vehicle and, in fact, the coupling plate assemblies 13/14/15 and 37/38/39 are both arranged so that the respective implements can be connected to three-point lifting devices or hitches whose lower lifting links are spaced apart from one another by different distances. The fact that the two implements of the combination can be used individually makes the provision of the combination much more economic than would be the case if the combination were a permanent and indissoluble one.

In the use of the combination which has been described, the coupling plate assemblies 13/14/15 and coupling plates 17 are connected to the three-point lifting device or hitch at the rear of an agricultural tractor and the intermediate telescopic transmission shaft 79 is employed to place the leading end of the driving shaft 71 in driven communication with the power take-off shaft of the same tractor or other operating vehicle. The effective depths of the fixed tines 5 and their hoeing members 7 is determined by the levels of the ground wheels 10 relative to the frame beam 2 and these levels are set by entering the bolts 12 through appropriate holes 11 in the mountings 9 and through the co-operating holes in the walls of the sleeves 8. It will be seen from the drawings that the axes of rotation of the wheels 10 are located to the rear of the longitudinal axis of the frame beam 2 with respect to the direction A. As the combination moves over the ground, the tines 5 cut through the soil to the required depth and the goose-foot hoeing members 7 break up the sub-soil to a considerable extent. The tines 22 of the immediately following rotary harrow 19 intensively crumble the overlying layers of top soil and other soil while, finally, the roller 52 crushes any remaining lumps of soil and gently compresses the ground to produce a bed that is generally ready to receive seeds or young plants that are to grow on to maturity. The clamping bolts 58 and spindle assemblies 59 are employed in the manner which has been described above to determine the level of the axis of rotation of the roller 52 relative to that of the frame portion 20 of the harrow 19 and it will be evident that the particular level which is chosen is the principal factor in determining the depth of penetration of the tines 22 of the soil working members or rotors 23 into the ground.

The combination that has been described enables a very thorough and effective cultivation of the subsoil and also the overlying top soil to be achieved and, under most conditions, will produce a seed bed whose air and water retention characteristics are at or near the optimum for seed germination and the growth of young plants. During operation, each of the two implements 1 and 19 bears upon the ground by way of at least one supporting member (i.e., the two ground wheels 10 of the cultivator 1 and the roller 52 of the harrow 19) and, since the cultivator 1 is pivotally connected to the tractor or other operating vehicle and the harrow 19 is pivotally connected to the cultivator, both implements can match undulations in the surface of the ground over which the combination travels and maintain a substantially constant working depth of the tines 5/hoeing members 7 and the tines 22. In this connection, it will be noted that, as seen in side elevation (FIG. 2), the pivots at the opposite ends of the lower arms 61 and single upper arm 62 are disposed at the four corners of a rectangle so that, in effect, the harrow 19 is coupled to the cultivator 1 through the intermediary of a parallelogram linkage which allows it to move upwardly and downwardly relative to the cultivator 1 without any significant tilting. The chains 66 reduce lateral swing of the harrow 19 relative to the cultivator 1 to a minimum since such swing is generally undesirable. When the combination is to be transported from one location to another without performing any working operation, it is lifted clear of the ground by raising the lifting links of the three-point lifting device or hitch of the operating agricultural tractor or other vehicle which brings the cultivator 1 to an elevated position in which its tines 5 are clear of the ground surface. The harrow 19 is similarly elevated because the chains 65, which are not normally taut during operation, are brought to a taut condition as the harrow 19 turns downwardly relative to the cultivator 1 thus preventing the harrow from moving downwardly too far. The chains 66 continue to perform their function of preventing the harrow 19 from swinging laterally relative to the cultivator 1 to any significant extent when the combination is in an elevated transport position.

Although various features of the combination that has been described and that is illustrated in the accompanying drawings will be set forth in the following claims as inventive features, it is emphasised that the invention is not necessarily limited to those features that it includes within its scope each of the parts of the combination that has been described and/or that has been illustrated in the accompanying drawings both individually and in various collective assemblies.

What we claim is:

1. A soil cultivating implement combination comprising a forward cultivator having a main frame beam with downwardly extending tines secured to said beam, said beam extending transverse to the normal direction of travel of said combination, rotary ground support means connected to the lateral ends of said beam, said support means including an adjustment device to vertically regulate the working depths of said tines, a harrow linked to said cultivator at the rear thereof, said harrow comprising a frame and a plurality of soil working members rotatably mounted on said frame, driving means connected to said soil working members and a rear ground supporting roller connected to said frame by adjustable arm means, whereby the working depths of said soil working members can be controlled, said frame beam and frame being linked to one another by a linkage for relative independent vertical movements, said driving means including a driving shaft that extends forwardly through said cultivator for connection to a p.t.o. of a prime mover and said cultivator having coupling means for connection to a lifting hitch of the prime mover.

2. A soil cultivating implement combination comprising a cultivator with frame beam means and downwardly extending tines fixed to said beam means, said combination comprising a rotary harrow having a plurality of tined soil working members rotatably supported on a frame of said harrow, said soil working members being rotatable about corresponding upwardly extending shafts and driving means drivenly connected to said shafts, said beam means having at least one ground supporting member that regulates the working depths of the tines and the frame of said harrow being connected to a further ground supporting member that controls the working depths of said tined members and both said cultivator and said rotary harrow having corresponding coupling means that can be individually coupled to the three-point lifting device of a tractor.

3. A combination as claimed in claim 2, wherein said cultivator has a main beam to which said tines are fixed, and said beam extends transverse to the normal direction of travel, two ground supporting members being connected adjacent the lateral ends of said beam.

4. A combination as claimed in claim 3, wherein each supporting member is a ground wheel which is rotatable about an axis located to the rear with respect to the normal direction of travel and each ground wheel is connected to an adjusting device and is vertically adjustable in position with respect to said main beam.

5. A combination as claimed in claim 2, wherein said cultivator and harrow are pivotally interconnected to one another by linking elements.

6. A combination as claimed in claim 5, wherein the pivotal connections between said cultivator and harrow comprises arms that pivotally interconnect corresponding locations of said coupling means of the cultivator and harrow that are intended for connection to a three-point lifting device.

7. A combination as claimed in claim 6, wherein one of said arms extends to pivotally link the upper coupling points of said corresponding coupling means and that arm is adjustable in length.

8. A combination as claimed in claim 2, wherein said driving means includes a driving shaft and said shaft is held by a suspension bearing, said bearing being pivotally connected to said frame beam means of the cultivator.

9. A combination as claimed in claim 8, wherein said bearing is located behind said beam means with respect to the normal direction of travel and is turnable relative to said beam means about at least two non-parallel axes.

10. A combination as claimed in claim 9, wherein said bearing is turnable about three axes relative to a main beam of said beam means, two of said axes being extendable parallel to one another when the third axis is perpendicular to said two axes.

11. A combination as claimed in claim 10, wherein said third axis is located between the said two axes.

12. A combination as claimed in claim 2, wherein flexible means interconnect said frame beam means to said frame to prevent lateral swing of said harrow relative to said cultivator.

13. A combination as claimed in claim 12, wherein said flexible means comprises at least one pair of chains.

14. A combination as claimed in claim 13, wherein there are two pairs of chains, the chains of one of said pairs extending forwardly from the harrow to the cultivator in upwardly inclined convergent relationship while the two chains of the other of said pair extend forwardly from said harrow to said cultivator in divergent relationship.

15. A combination as claimed in claim 2, wherein said further supporting member is rotatable and positioned behind said soil working members with respect to the normal direction of travel and is connected to said frame by adjusting means and vertically adjustable in position relative to said soil working members.

* * * * *